US009839291B2

(12) United States Patent
Aoi et al.

(10) Patent No.: US 9,839,291 B2
(45) Date of Patent: Dec. 12, 2017

(54) CONNECTING ROD AND DOUBLE RECLINING MECHANISM

(71) Applicant: SHIROKI CORPORATION, Fujisawa-shi, Kanagawa (JP)

(72) Inventors: Hirohito Aoi, Kanagawa (JP); Tomohiro Enokijima, Kanagawa (JP)

(73) Assignee: SHIROKI CORPORATION, Kanagawa (JP)

( * ) Notice: Subject to any disclaimer, the term of this patent is extended or adjusted under 35 U.S.C. 154(b) by 566 days.

(21) Appl. No.: 14/307,571

(22) Filed: Jun. 18, 2014

(65) Prior Publication Data
US 2014/0290454 A1    Oct. 2, 2014

Related U.S. Application Data

(62) Division of application No. 13/636,444, filed as application No. PCT/JP2011/053014 on Feb. 14, 2011, now abandoned.

(30) Foreign Application Priority Data

Apr. 1, 2010    (JP) .................................. 2010-084958

(51) Int. Cl.
*F16D 1/00*    (2006.01)
*A47C 1/024*    (2006.01)
(Continued)

(52) U.S. Cl.
CPC ................ *A47C 1/024* (2013.01); *B60N 2/22* (2013.01); *B60N 2/2252* (2013.01); *F16D 1/10* (2013.01);
(Continued)

(58) Field of Classification Search
CPC .... A47C 1/024; B60N 2/2252; B60N 2/3011; B60N 2/3013; B60N 2/22; B60N 2/20;
(Continued)

(56) References Cited

U.S. PATENT DOCUMENTS 3,768,527 A * 10/1973 Messick ............... B23Q 35/102
142/38
4,290,647 A *  9/1981 Hensel ..................... B60N 2/20
297/354.1
(Continued)

FOREIGN PATENT DOCUMENTS

CN       1550684 A      12/2004
EP     0 685 379 A1     12/1995
(Continued)

OTHER PUBLICATIONS

International Search Report for the Application No. PCT/JP2011/053014 dated Mar. 15, 2011.

*Primary Examiner* — Richard Chang
(74) *Attorney, Agent, or Firm* — Cheng Law Group, PLLC

(57) ABSTRACT

A method of manufacturing a connecting rod is provided. The method includes the steps of (1) forming, on a long rod material, a rotation transmitting portion having a non-circular cross section; (2) cutting the rod material to provide the rotation transmitting portion at each of both ends; and (3) forming, by cutting work, a small-diameter column portion and a tapered portion at a first end of the cut rod material from a tip-end side. The small-diameter column portion has a diameter smaller than a diameter of the rotation transmitting portion. The tapered portion is provided continuously from the small-diameter column portion and gradually increases in diameter. The rotation transmitting portion is provided continuously from the tapered portion.

5 Claims, 6 Drawing Sheets

(51) Int. Cl.
*B60N 2/22* (2006.01)
*F16D 1/10* (2006.01)
*B60N 2/225* (2006.01)
*F16C 3/02* (2006.01)

(52) U.S. Cl.
CPC ............ *B60N 2205/50* (2013.01); *F16C 3/02* (2013.01); *F16D 2001/103* (2013.01); *Y10T 83/0524* (2015.04)

(58) Field of Classification Search
CPC ........... B60N 2205/50; Y10T 29/49936; Y10T 29/49947; Y10T 29/49995; Y10T 83/0524; F16D 1/10; F16D 2001/103; B23P 19/02; F16C 3/02
USPC ................ 29/558; 297/354.1, 354.12, 361.1, 297/362.12, 68; 296/65.16; 464/179, 464/180, 77; 475/162; 16/386; 74/519, 74/522.5
See application file for complete search history.

(56) References Cited

U.S. PATENT DOCUMENTS

| | | | | |
|---|---|---|---|---|
| 5,090,264 A * | 2/1992 | Droulon | .................. | B60N 2/22 403/229 |
| 6,319,337 B1 * | 11/2001 | Yoshida | .................. | C22C 38/02 148/320 |
| 6,505,889 B2 * | 1/2003 | Frolo | ...................... | B60N 2/22 297/354.12 |
| 7,152,708 B2 * | 12/2006 | Campbell | ............... | B60K 17/22 180/376 |
| 7,699,397 B2 * | 4/2010 | Andou | ................. | B60N 2/2356 297/354.12 |
| 8,430,454 B2 * | 4/2013 | Tanguy | ................ | B60N 2/2356 297/367 L |
| 8,448,335 B2 * | 5/2013 | Lundgren | ................. | B23C 3/34 29/890.01 |
| 2004/0235575 A1 | 11/2004 | Sakurai et al. | | |
| 2005/0099049 A1 * | 5/2005 | Spey | ........................ | B60N 2/22 297/361.1 |
| 2006/0158013 A1 * | 7/2006 | Kawashima | ......... | B60N 2/2252 297/362 |
| 2009/0134682 A1 * | 5/2009 | Andou | ................. | B60N 2/2356 297/362.12 |
| 2010/0072772 A1 | 3/2010 | Gamache et al. | | |

FOREIGN PATENT DOCUMENTS

| | | |
|---|---|---|
| EP | 0 936 128 A1 | 8/1999 |
| FR | 2 802 255 | 6/2001 |
| JP | 5-212470 A | 8/1993 |
| JP | 6-262291 A | 9/1994 |
| JP | 2002-101996 A | 4/2002 |
| JP | 2003-117631 A | 4/2003 |
| JP | 2008-51221 A | 3/2006 |
| JP | 2007-92932 A | 4/2007 |

* cited by examiner

CONNECTING ROD AND DOUBLE RECLINING MECHANISM

CROSS-REFERENCES TO RELATED APPLICATIONS

This application is a Divisional Application of patent application Ser. No. 13/636,444, filed on Oct. 17, 2012, which is a 371 application of Application No. PCT/JP2011/053014, filed on Feb. 14, 2011, which is based on Japanese Application No. 2010-084958, filed on Apr. 1, 2010, the entire contents of which are hereby incorporated by reference.

TECHNICAL FIELD

The present invention relates to a connecting rod out in a predetermined length by shearing work and provided with rotation transmitting portions having a non-circular cross section at least at both ends and to a double reclining mechanism having the connecting rod.

BACKGROUND ART

In a double reclining mechanism provided with reclining mechanisms each tilting a seat back with respect to a seat cushion on both sides of a seat, a connection rod provided with splines or serrations is used to transmit an action of one reclining mechanism to the other reclining mechanism (see, for example, JP-A-2002-101996).

The connecting rod described in JP-A-2002-101996 is manufactured by providing a long rod material with splines on an entire peripheral surface by extrusion molding followed by cutting in a predetermined length by shearing work

SUMMARY OF THE INVENTION

Problems that the Invention is to Solve

However, a method, of cutting the long rod material in a predetermined length is the shearing work using a movable blade and a stationary blade. Hence, a shear drop (rounded portion), a shear surface (glossy surface), a fracture surface (matte surface), and a burr (weld flash) occur on a cut surface of the cut rod material. Further, a shear drop also occurs on the peripheral surface in the vicinity of the cut surface. In short, the splines or the serrations in the vicinity of the cut surface have undergone plastic deformation.

As is shown in FIG. 7, even when a chamfered portion 3 is provided by applying chamfering work to a cut portion of a connecting rod 1, shear drops D remain in the splines or serrations.

The shear drops D remaining in the splines or the serrations of the connecting rod 1 raises a problem that insertion performance becomes poor when the connecting rod 1 is inserted into a hole (a hole provided with splines or serrations on an inner peripheral surface) in a seating member. When an inside diameter of the hole in the mating member is increased to improve the insertion performance, the splines or the serrations engage with each other while leaving a clearance. This raises a problem that vibrations and noises are generated between the connecting rod 1 and the mating member.

Also, when chamfering is applied so as to eliminate the shear drops D completely, as is shown in FIG. 8, a chamfered portion 3 is formed in a conical shape with a sharply pointed tip and is therefore unsafe.

The invention was devised in view of the problems above and has an object to provide a connecting rod having satisfactory insertion performance for a mating member and generating neither vibrations nor noises and a double reclining mechanism.

Means for Solving the Problems

A first invention to solve the problems above is a connecting rod exit in a predetermined length by shearing work and provided with a rotation transmitting portion having a non-circular cross section at least at each of both ends, and configured in such a manner that at least, one end is provided with, from a tip-end side: a small-diameter column portion having a diameter smaller than a diameter of the rotation transmitting portion; a tapered portion provided continuously from the small-diameter column portion and gradually increasing in diameter; and the rotation transmitting portion provided continuously from the tapered portion.

A second invention is the connecting rod of the first invention above configured in such a manner that the other end is provided with, from a tip-end side: a fall-out preventing portion allowed to abut on an opening rim of a hole in which to insert the rotation transmitting portion; a tapered portion provided continuously from the fall-out preventing portion and gradually increasing in diameter with distances from a tip end; and the rotation transmitting portion provided continuously from the tapered portion.

A third invention is a a double reclining mechanism provided with reclining mechanisms each tilting a seat back with respect to a seat cushion on both sides of a seat and configured in such a manner that the connecting rod of the first invention above is used as a connecting rod that transmits an action of one reclining mechanism to the other reclining mechanism.

A fourth invention is a double reclining mechanism provided with reclining mechanisms each tilting a seat back with respect to a seat cushion on both sides of a seat, and configured in such a manner that the connecting rod of the second invention above is used as a connecting rod that transmits an action of one reclining mechanism to the other reclining mechanism.

Advantages of the Invention

According to the first and third inventions above, the small-diameter column portion having a diameter smaller than a diameter of the rotation transmitting portion, the tapered portion provided continuously from the small-diameter column portion and gradually increasing in diameter, and the rotation transmitting portion provided continuously from the tapered portion are provided at least at one end from the tip-end side. By forming the small-diameter column portion and the tapered portion by shearing work until all shear drops are eliminated from the rotation transmitting portion, insertion performance for a hole in a mating member becomes satisfactory. Further, as the insertion performance becomes satisfactory, a clearance between the rotation transmitting portion and the mating member can be smaller and therefore neither vibrations nor noises are generated. In addition, the tapered portion serves as a guide when the connecting rod is inserted into the hole in the mating member.

Further, the small-diameter column portion can be cut without giving adverse effects to the rotation transmitting portion. Also, by applying press work to the small-diameter column portion, the small-diameter column portion can be also used to prevent a fall-out.

The rotation transmitting portions include splines and serrations provided on the peripheral surface of the rod. Also, the rotation transmitting portions may have a cross section of an elliptical shape, a polygonal shape, or the like.

According to the second and fourth inventions above, by providing the fall-out preventing portion allowed to abut on the opening rim of the hole in which to insert the rotation transmitting portion at the other end from the tip-end side, the connecting rod is prevented from falling out in a direction of insertion.

MODE FOR CARRYING OUT THE INVENTION

Figure 4:
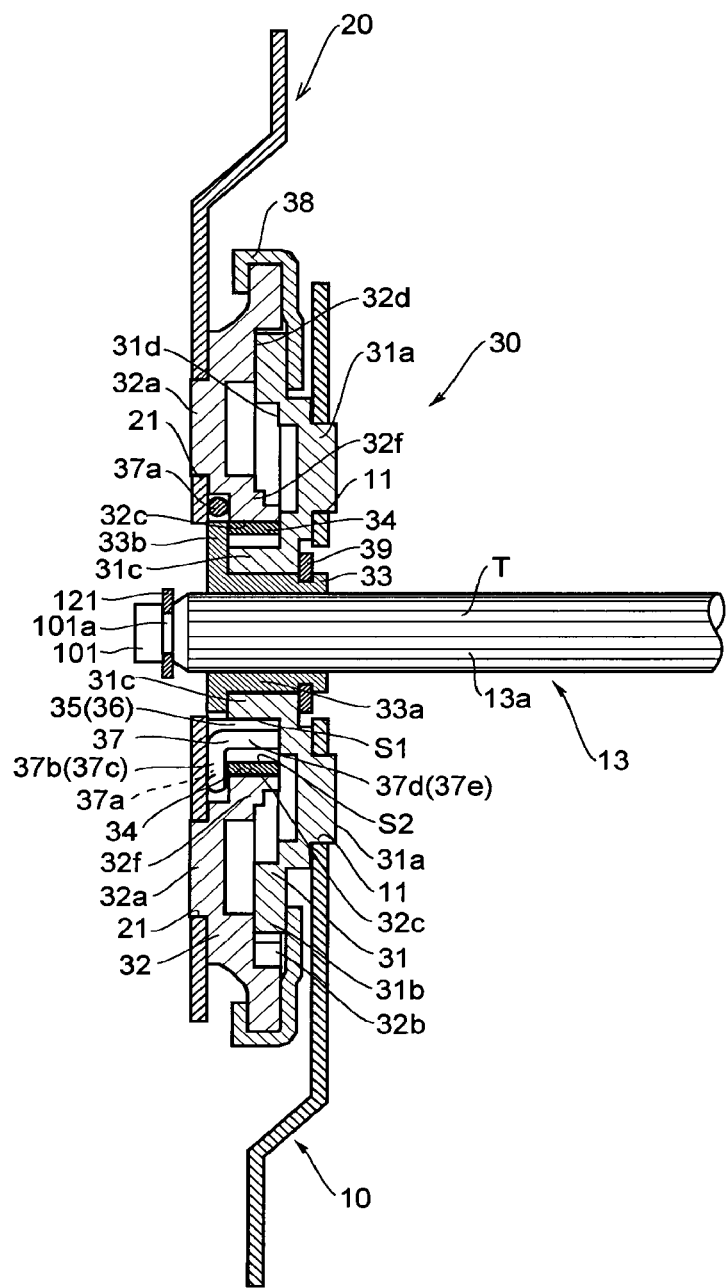
FIG. 4 is a longitudinal cross section of a reclining apparatus on one side.
Figure 5:
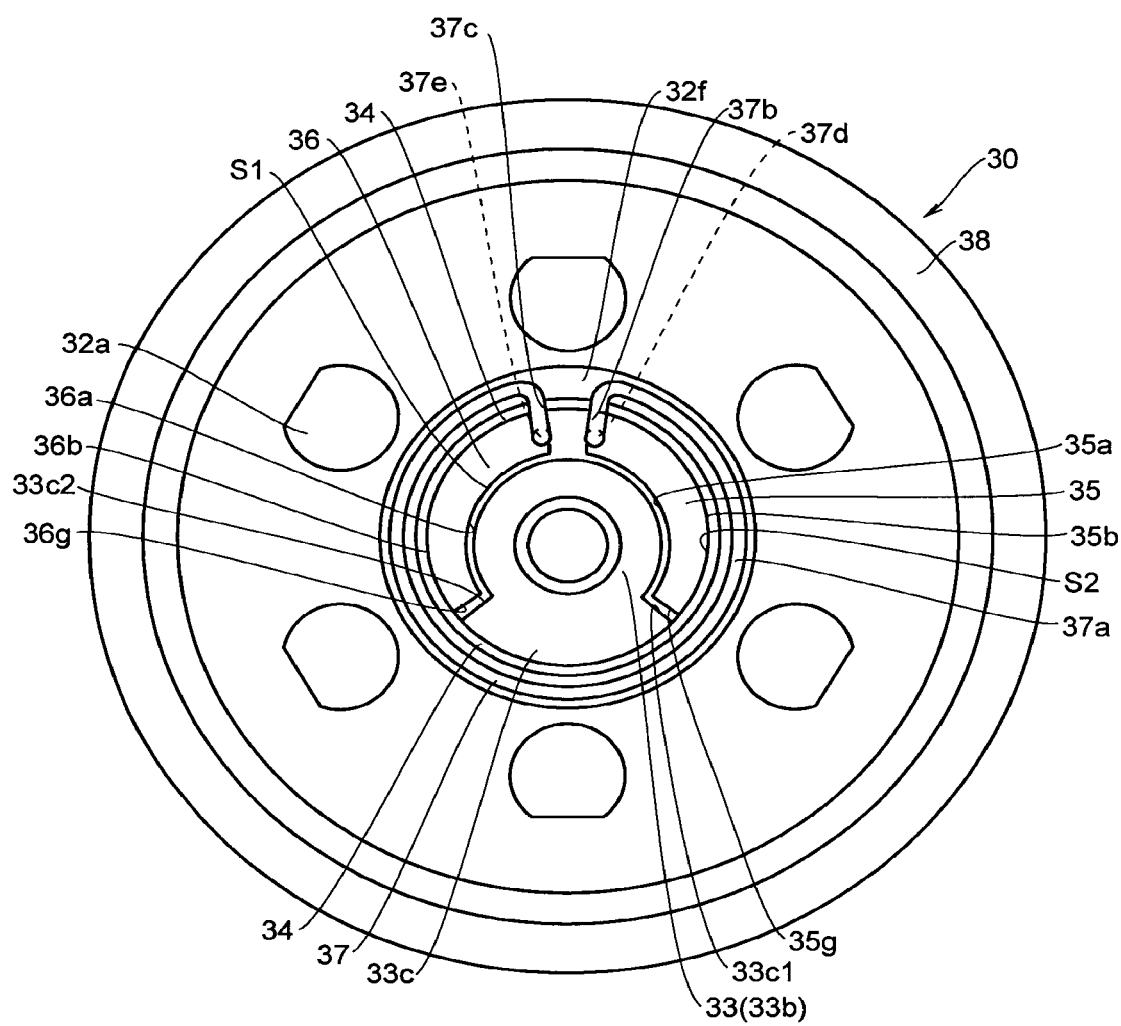
FIG. 5 is a left side view of the reclining apparatus of FIG. 4 from which an upper arm and a lower arm are removed.
Figure 6:
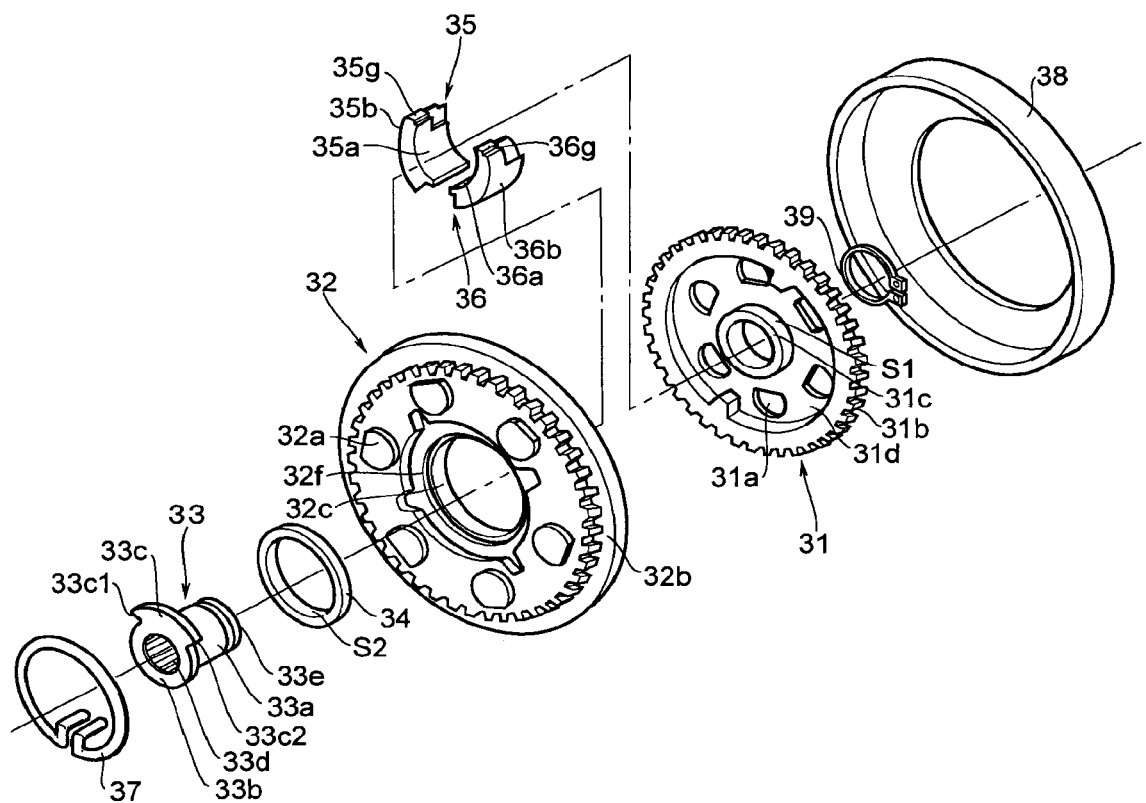
FIG. 6 is an exploded perspective view of a major portion of the reclining apparatus shown in FIG. 4.
Figure 7:
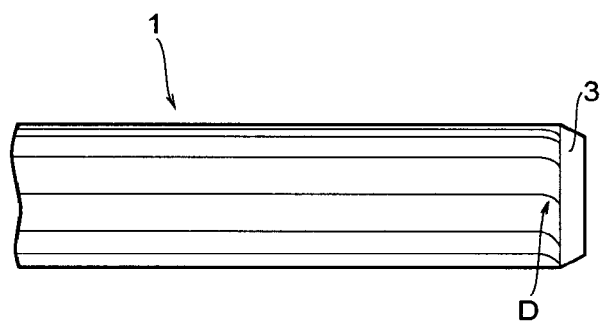
FIG. 7 is a view used to describe an end of a connecting rod in the related art.

Firstly, a double reclining apparatus using a connecting rod of the present embodiment will be described using FIG. 4 through FIG. 6. FIG. 4 is a longitudinal cross section of a reclining apparatus on one side. FIG. 5 is a left side view of the reclining apparatus shown in FIG. 4 from which an upper arm and a lower arm are removed. FIG. 6 is an exploded perspective view of a major portion of the reclining apparatus shown in FIG. 4.

A lower arm 10, a partial cross section of which is shown in FIG. 4, is fixed to a frame (not shown) of a seat cushion with a bolt or the like. Six fitting holes 11 (two of which are shown in FIG. 4) are punched out in the lower arm 10 to be located on a same circle on the periphery of a tilting center position of a seat back (a region that crosses a tilting central shaft of the seat back).

An upper arm 20 is fixed to a frame (not shown) of the seat back with a bolt or the like. Six fitting holes 21 (two of which are shown in FIG. 4) are punched out in the upper arm 20 to be located on a same circle on the periphery of the tilting center position of the seat back (the region that crosses the tilting central shaft of the seat back).

A gear mechanism 30 is attached between the lower arm 10 and the upper arm 20 and adjusts an angle of tilt of the upper arm 20. A plurality of fixing protrusions 31a and 32a that fit, respectively, into the fitting holes 11 of the lower arm 10 and the fitting holes 21 of the upper arm 20 are provided, respectively, to an external gear 31 and an internal gear 32 in the gear mechanism 30.

As are shown in FIG. 4 and FIG. 6, the external gear 31 is of substantially a disc shape and provided with external teeth 31b on an outer peripheral surface and a cylinder portion 31c at a center. A ring-shaped recess portion 31d is formed on the periphery of the cylinder portion 31c. The external gear 31 is positioned by fitting the six fixing protrusions 31a provided on the side surface into the fitting holes 11 of the lower arm 10 and welded to the lower arm 10 after the positioning.

As are shown in FIG. 4 and FIG. 6, the internal gear 32 is also of substantially a disc shape. The internal gear 32 is provided with internal teeth 32b carved therein that outnumber the external teeth 31b of the external gear 31 at least by one and are inscribed in the external teeth 31b. Also, a circular through-hole (circular hole) 32c is punched out in the internal gear 32 at a center. The through-hole 32c is provided on an inner side of a cylindrical rib-like portion 32f and a ring-shaped recess portion 32d is provided in a region between the cylindrical rib-like portion 32f and the internal teeth 32b. The internal gear 32 is positioned by fitting the six fixing protrusions 32a on the side surface into the fitting holes 21 of the upper arm 20 and welded to the upper arm 20 after the positioning.

A cylindrical shaft portion 33a of a rotation shaft (wedge releasing member) 33 shown in FIG. 6 is fit into the cylinder portion 31c of the external gear 31 in a rotatable manner. The rotation shaft 33 is rotated back and forth about a center of an inner cylindrical surface of the cylinder portion 31c as a rotation shaft. The rotation shaft 33 has a disc-shaped flange portion 33b at a tip end of the cylindrical shaft portion 33a and a fan-shaped striker portion 33c protruding from the flange portion 33b outwardly in a radial direction about a rotation shaft (axial line of the cylindrical shaft portion 33a). Coupling serrations 33d are provided on an inner cylindrical surface of the cylindrical shaft portion 33a.

A cylindrical bush 34 with excellent abrasion resistance is fit to the through-hole 32c of the internal gear 32 and fixed therein. Further, a pair of wedge-shaped members 35 and 36 is inserted into a space between an inner cylindrical guide surface S1 formed of an outer cylindrical surface of the cylinder portion 31c of the external gear 31 and an outer cylindrical guide surface S2 formed of an inner cylindrical surface of the bush 34 in such a manner that the wedge-shaped members 35 and 36 are in contact with the both guide surfaces S1 and S2 in a slidable manner.

The wedge-shaped members 35 and 36 are of a plane-symmetrical shape and a structure of the wedge-shaped member 35 will be described with reference to FIG. 6. The wedge-shaped member 35 has an inner cylindrical surface 35a formed of a cylindrical surface having a diameter size and a curvature substantially same as those of the inner cylindrical guide surface S1 and an outer cylindrical surface 35b formed of a cylindrical surface having a diameter size and a curvature substantially same as those of the outer cylindrical guide surface S2. Central shafts of the inner cylindrical surface 35a and the outer cylindrical surface 35b of the wedge-shaped member 35 do not coincide with each other. Owing to this configuration, a thickness of the wedge-shaped member 35 varies in the manner of a wedge. In the description below, an end in a circumferential direction of the wedge-shaped member 35 on a side where a thickness in a width direction linking the inner cylindrical surface 35a and the outer cylindrical surface 35b is increased is referred to as a thick end and an end in a circumferential direction on a side where a thickness in the width direction is decreased is referred to as a thin end.

The wedge-shaped member 36 that is symmetrical to the wedge-shaped member 35 has the same structure. More specifically, an inner cylindrical surface 36a and an outer-cylindrical surface 36b of the wedge-shaped member 36 have diameter sizes and curvatures substantially same as those of the inner cylindrical guide surface S1 on the side of the external gear 31 and those of the outer cylindrical guide surface S2 of the bush 34 (on the side of the internal gear 32), respectively. Also, central shafts do not coincide with each other and therefore a thickness of the wedge-shaped member 36 varies in the manner of a wedge.

The wedge-shaped members 35 and 36 are inserted into a space between the inner cylindrical guide surface S1 on the side of the external gear 31 and the outer cylindrical guide surface S2 on the side of the bush 34 (on the side of the internal gear 32) in such a manner that the respective thick ends oppose each other. In this insertion state, each of the inner cylindrical surfaces 35a and 36a of the wedge-shaped members 35 and 36, respectively, is in contact with the inner cylindrical guide surface S1 in a slidable manner, and each of the outer cylindrical surfaces 35b and 36b of the wedge-shaped members 35 and 36, respectively, is in contact with the outer cylindrical guide surface S2 in a slidable manner.

The wedge-shaped members 35 and 36 receive a pushing force in a direction to move apart from each other from a spring (pushing means) 37 as an elastic member.

The wedge-shaped members 35 and 36 as above decenter the internal gear 32 with respect to the external gear 31 to let the internal teeth 32b engage with the external teeth 31b. The central shafts of the inner cylindrical shafts 35a and 36a and the central shafts of the outer cylindrical surfaces 35b and 36b of the wedge-shaped members 35 and 36, respectively, do coincide with each other. Accordingly, the internal gear 32 on the side having the outer cylindrical surface S2 is positioned eccentrically with respect to the external gear 31 on the side having the inner cylindrical guide surface S1. The internal teeth 32b are therefore engaged with the external teeth 31b in this eccentric state. Via these wedge-shaped members 35 and 36, the rotation shaft 33 allows the external gear 31 and the internal gear 32 to undergo relative motion in such a manner that an engaging position of the external teeth 31b and the internal teeth 32b is changed while allowing the through-hole 32c (bush 34) to undergo eccentric motion with respect to the cylinder portion 31c.

A cylindrical press member 38 fits to the outer peripheral surface of the internal gear 32 and both ends thereof protrude toward the central shaft to sandwich the external gear 31 and the internal gear 32 (see FIG. 4). Owing to this configuration, it becomes possible to regulate the external gear 31 and the internal gear 32 not to move apart in an axial direction. A ring-shaped groove 33e is carved in at a tip end portion of the rotation shaft 33 and a fall-out preventing ring 39 is locked therein.

The reclining apparatuses in pairs are disposed symmetrically on both sides of each seat and the rotation shafts 33 on the right and left are coupled to each other via a connecting rod 13 (see FIG. 4) inserted and fixed in the serrations 33d of the cylindrical shaft portions 33a. The connecting rod 13 is provided with serrations 13a on an entire peripheral surface. Hence, of the serrations 13a provided on the entire peripheral surface, portions that fit to the serrations 33d of the cylindrical shaft portions 33a of the rotation shafts 33 function as rotation transmitting portions T of the connecting rod 13.

Then, the connecting rod 13 and the rotation shaft 33 are driven to rotate when an angle of tilt of the seat back is adjusted.

While the reclining apparatus as above is in a state where a rotary operation force is not applied to the connecting rod 13 (rotation shaft 33) from an outside, the spring 37 keeps pushing the wedge-shaped members 35 and 36 in a direction in which the wedge-shaped members 35 and 36 move apart from each other and thereby constantly gives a force in a direction in which the wedges are knocked in both the wedge-shaped members 35 and 36. Accordingly, relative motion of the internal gear 32 and the rotation shaft 33 is inhibited. Hence, the gear mechanism 30 is in a locked state and the seat back is locked at the position where it is.

By rotating the rotation shaft 33 in this locked state, for example, in a counterclockwise direction of FIG. 5, a press surface 33c1 of the rotation shaft 33 abuts on a striker abutting surface 35g of the wedge-shaped member 35 and a force in a direction in which to pull out the wedge-shaped member 35 from the clearance is given. Then, the rotation shaft 33 and the wedge-shaped member 35 rotate in a counterclockwise direction with respect to the internal gear 32. Consequently, a clearance is developed between the wedge-shaped member 35 and the peripheral members and the internal gear 32 is allowed to move. Accordingly, the wedge-shaped member 36 under a pushing force of the spring 37 starts to rotate in a counterclockwise direction so as to fill the clearance.

Owing to this ganged operation, the wedge-shaped members 35 and 36 rotate in a counterclockwise direction together with the rotation shaft 33. The same applies to rotations in a clockwise direction. When a press surface 33c2 of the rotation shaft 33 abuts on a striker abutting surface 36g of the wedge-shaped member 36 and a force in a direction in which to pull out the wedge-shaped member 36 from the clearance is given, the wedge-shaped members 35 and 36 rotate in a clockwise direction together with the rotation shaft 33. Hence, the internal gear 32 is supported on the rotation shaft 33 at an eccentric position at which the internal teeth 32b engage with the external teeth 31b. The external gear 31, the internal gear 32, and the rotation shaft 33 therefore form the gear mechanism. By rotating the rotation shaft 33 in this manner, the gear mechanism 30 in a locked state shifts to an unlocked state, so that the engaging position of the external teeth 31b and the internal teeth 32b is changed while the internal gear 32 undergoes eccentric motion with respect to the external gear 31. Consequently, it becomes possible to adjust an angle of tilt of the seat back by tilting the upper arm 20 with respect to the lower arm 10.

Figure 1:
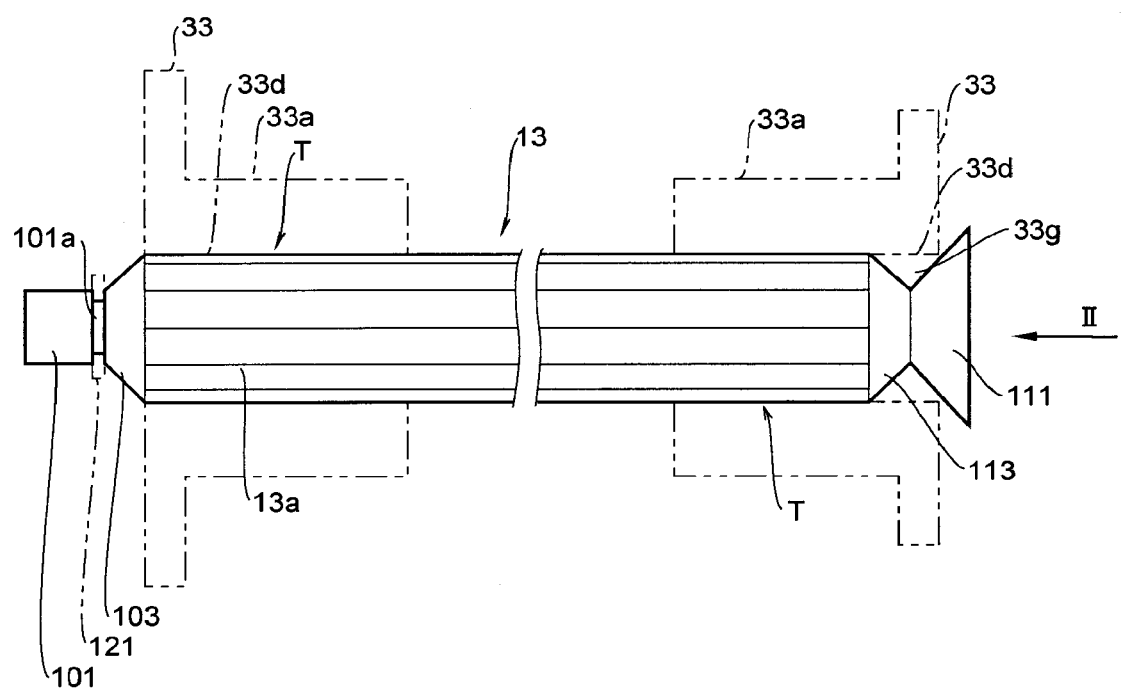
FIG. 1 is a sectional side view of a connecting rod of one embodiment.
Figure 2:
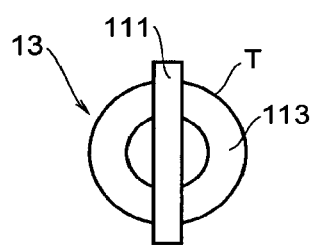
FIG. 2 is a perspective view in a II direction of FIG. 1.
Figure 3:
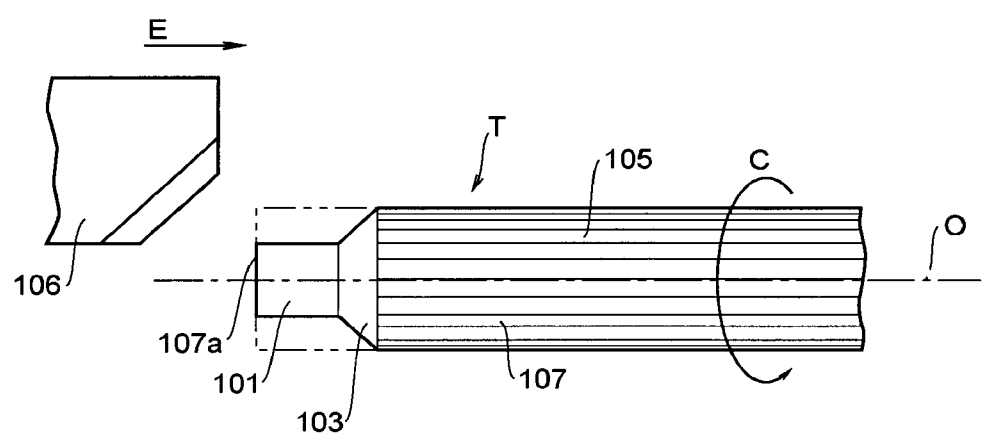
FIG. 3 is a view used to describe a method of providing a small-diameter column portion and a tapered portion of FIG. 1.

The connecting rod 13 will now be described in detail using FIG. 1 through FIG. 3. FIG. 1 is a side view of a connecting rod of one embodiment. FIG. 2 is a perspective view in the direction of the arrow labeled "II" in FIG. 1. FIG. 3 is a view used to describe a method of providing a small-diameter column portion and a tapered portion of FIG. 1.

As the connecting rod 13 of this embodiment, a long rod material provided with serrations on the entire peripheral surface by extrusion molding and cut in a predetermined length is used. Cutting of this embodiment was performed by shearing work using a movable blade and a stationary blade and requiring low processing costs.

The connecting rod 13 is provided, at one end (on the side shown in FIG. 4) from a tip-end side, with a small-diameter column portion 101 having a diameter smaller than a diameter of the rotation transmitting portion T, a tapered portion 103 provided continuously from the small-diameter column portion 101 and gradually increasing in diameter, and the rotation transmitting portion T provided continuously from the tapered portion 103.

The connecting rod 13 configured as above is formed as is shown in FIG. 3. That is, a rod material 107 cut in a predetermined length and provided with serrations 105 on the entire peripheral surface is rotated in a direction indicated by an arrow C about a central shaft O of the rod material 107 and a bite 106 is moved from a cut surface 107a of the rod material 107 in a direction indicated by an arrow E. Consequently, the small-diameter column portion 101 and the tapered portion 103 are provided at a tip end of the rod material 107 by cutting work. In this case, the small-diameter column portion 101 and the tapered portion 103 are formed until all shear drops are eliminated from a peripheral surface in the vicinity of the cut surface, that is, a portion that serves as the rotation transmitting portion T.

Referring to FIG. 1 again, the connecting rod 13 is provided, at the other end and from a tip-end side, a fall-out preventing portion 111 allowed to abut on a rim of an opening 33g of the inner cylindrical portion of the cylindrical shaft portion 33a of the rotation shaft 33, which opening 33g is a hole in which to insert the rotation transmitting portion T, a tapered portion 113 provided continuously from the fall-out preventing portion 111 and gradually increasing in diameter with distances from the tip end, and the rotation transmitting portion T provided continuously from the tapered portion 113. In this embodiment, the fall-out preventing portion 111 is formed by applying press work to the small-diameter column portion 101.

Further, in this embodiment, a groove 101a is provided to the small-diameter column portion 101 at one end of the connecting rod 13.

The connecting rod 13 of this embodiment is inserted, with the small-diameter column portion 101 at the top, from the inner cylindrical portion of the cylindrical shaft portion 33a of the rotation shaft 33 of the reclining apparatus on the other side in a direction indicated by an arrow II and then inserted into the inner cylindrical portion of the cylindrical shaft portion 33a of the rotation shaft 33 of the reclining apparatus on one side. Subsequently, a fall-out preventing ring 121 is attached to the groove 101a of the small-diameter column portion 101.

According to the connecting rod 13 configured as above, advantages as follows can be obtained.

(1) Because the small-diameter column portion 101 having a diameter smaller than a diameter of the rotation transmitting portion T, the tapered portion 103 provided continuously from the small-diameter column portion 101 and gradually increasing in diameter, and the rotation transmitting portion T provided continuously from the tapered portion 103 are provided at one end of the connecting rod 13 from the tip-end side, by forming the small-diameter column portion 101 and the tapered portion 103 by cutting work until all shear drops are eliminated from the rotation end T, insertion performance for the inner cylindrical portion of the cylindrical shaft portion 33a of the rotation shaft 33, which is a hole in the mating member, becomes satisfactory.

Further, as the insertion performance becomes satisfactory, a clearance between the serrations 13a (rotation transmitting portion T) of the connecting rod 13 and the serrations 33d of the inner cylindrical portion of the cylindrical shaft portion 33a of the rotation shaft 33 can be smaller and therefore neither vibrations nor noises are generated.

(2) The tapered portion 103 serves as a guide when the connecting rod 13 is inserted into the inner cylindrical portion of the cylindrical shaft portion 33a of the rotation shaft 33, which is a hole in the mating member.

(3) The small-diameter column portion 101 of the connecting rod 13 can be cut without giving adverse effects to the rotation transmitting portion T.

(4) Because the fall-out preventing portion 111 allowed to abut on the rim of the opening 33g of the inner cylindrical portion of the cylindrical shaft portion 33a of the rotation shaft 33, which opening 33g is a hole in which to insert the rotation transmitting portion T, is provided at the other end of the connecting rod 13, the connecting rod 13 is prevented from falling out in a direction of insertion (direction indicated by the arrow II of FIG. 1).

(5) Because the fall-out preventing portion 111 is provided by applying press work to the small-diameter column portion 101, the cost is reduced in comparison, for example, with a configuration in which a groove is formed in the peripheral surface of the small-diameter column portion 101 and fall-out preventing means, such as a fall-out preventing ring to be fit to this groove, is provided.

Figure 8:
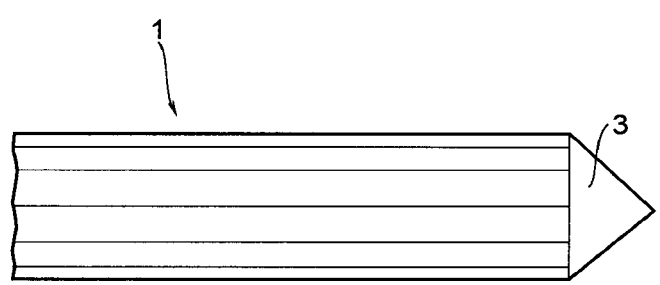
FIG. 8 is a view used to describe an end of the connecting rod in the related art.

(6) In comparison with a case as shown in FIG. 8 where a tapered portion of a conical shape having a sharply pointed tip is provided at the end by chamfering to completely eliminate shear drops, the embodiment above is safe because the small-diameter column portion is provided at the end. Also, a cutting amount is small in the embodiment above in comparison with the case of FIG. 8 where a tapered portion of a conical shape is provided. Hence, the processing costs are low and a blade of the bite can have a longer life.

It should be appreciated that the invention is not limited to the embodiment above. The serrations 13a of the connecting rod 13 of the embodiment above are provided on the entire peripheral surface of the connecting rod 13. Serrations, however, may be provided at the both ends alone.

Further, the rotation transmitting portions T are not limited to the serrations. Besides the serrations, rotation transmitting portions merely having a non-circular cross section are also available. For example, splines may be provided on the peripheral surface or the cross section may be of an elliptical shape or a polygonal shape.

Furthermore, the groove 101a, which is formed in the small-diameter column portion 101 at one end of the connecting rod 13 and to which the fall-out preventing ring 121 is fit, may be omitted.

DESCRIPTION OF REFERENCE NUMERALS AND SIGNS

13: connecting rod
101: small-diameter column portion
103: tapered portion
T: rotation transmitting portion

The invention claimed is:

1. A method of manufacturing a connecting rod, comprising:
  forming, on a peripheral surface of a long rod, a rotation transmitting portion having a non-circular cross section and comprising serrations;
  forming, by cutting the rod on the peripheral surface on which the rotation transmitting portion is formed, a first small-diameter column portion at a first distal end of the rod and a first tapered portion adjacent to the first small-diameter column portion, such that the rotation transmitting portion is opposite the first small-diameter column with respect to the first tapered portion,
  the first small-diameter column portion having a diameter smaller than a diameter of the rotation transmitting portion, the first tapered portion being provided continuously from the first small-diameter column portion and gradually increasing in diameter, the rotation transmitting portion being provided continuously from the first tapered portion.

2. The method of manufacturing a connecting rod according to claim 1, further comprising:
  forming, by cutting the rod on the peripheral surface on which the rotation transmitting portion is formed, a second small-diameter column portion at a second distal end of the rod and a second tapered portion adjacent to the second small-diameter column portion, such that the rotation transmitting portion is opposite the second small-diameter column with respect to the second tapered portion, the second small-diameter column portion having a diameter smaller than the diameter of the rotation transmitting portion, the second tapered portion being provided continuously from the second small-diameter column portion and gradually increasing in diameter, the rotation transmitting portion being provided continuously from the second tapered portion; and forming, by pressing the second small-diameter column portion provided to the second distal end of the rod, a fall-out preventing portion allowed to abut on an opening rim of a hole in which to insert the rotation transmitting portion.

3. The method of manufacturing a connecting rod according to claim 2, wherein the fall-out preventing portion is pressed to be tapered in a direction opposite to the second tapered portion such that a cross-sectional area of the fall-out preventing portion gradually increases toward the second distal end of the rod.

4. The method of manufacturing a connecting rod according to claim 1, wherein cutting the rod on the peripheral surface on which the rotation transmitting portion is formed is conducted by moving a cutting tool in an axial direction from the first distal end of the rod.

5. The method of manufacturing a connecting rod according to claim 1, fluffier comprising forming a groove at a position between the first small-diameter column portion and the first tapered portion, the groove having a smaller diameter than the diameter of the first small-diameter column portion.

* * * * *